(12) United States Patent  (10) Patent No.: US 11,012,290 B2
Cardozo  (45) Date of Patent: May 18, 2021

(54) SYSTEMS AND METHODS FOR NODE OUTAGE DETERMINATION AND REPORTING

(71) Applicant: Landis+Gyr Innovations, Inc., Alpharetta, GA (US)

(72) Inventor: Ruben Salazar Cardozo, Johns Creek, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 0 days.

(21) Appl. No.: 16/211,867

(22) Filed: Dec. 6, 2018

(65) Prior Publication Data

US 2020/0186415 A1  Jun. 11, 2020

(51) Int. Cl.
*H04L 12/24* (2006.01)
*H04L 12/26* (2006.01)
*H04W 40/24* (2009.01)
*H04W 84/18* (2009.01)

(52) U.S. Cl.
CPC .......... *H04L 41/0677* (2013.01); *H04L 43/10* (2013.01); *H04W 40/244* (2013.01); *H04W 84/18* (2013.01)

(58) Field of Classification Search
CPC .................................................. H04W 40/244
See application file for complete search history.

(56) References Cited

U.S. PATENT DOCUMENTS 6,332,072 B1 * 12/2001 Johnson ................... H04B 7/08
342/368

10,056,159 B1 * 8/2018 Patel ....................... H04L 12/66
(Continued)

FOREIGN PATENT DOCUMENTS

WO  2008033514  3/2008

OTHER PUBLICATIONS

Li et al., "Robust Networking for Bandwidth Constrained Mobile Tactical Radio", IEEE 75th Vehicular Technology Conference (VTC Spring 2012), May 6, 2012, 5 pages.
(Continued)

*Primary Examiner* — Gregory B Sefcheck
*Assistant Examiner* — Debebe A Asefa
(74) *Attorney, Agent, or Firm* — Kilpatrick Townsend & Stockton LLP (57) ABSTRACT

A method includes receiving beacons originating from endpoints. The beacons are received during a single beacon interval and are sent using a power strength to reach nodes within physical proximity of the endpoints. The method also includes establishing a list including multiple endpoints from which a node receives the beacons at more than a threshold percentage of the beacon intervals. The method includes detecting that a threshold number of the beacon intervals have passed since receiving a most recent beacon from an endpoint. The method includes outputting a ping at full power strength to the endpoint requesting a response. When the response is not received from the endpoint, the method includes transmitting an outage alarm to a next topologically higher layer of a mesh network. The outage alarm includes an identification of the endpoint and a timestamp indicating when the first node received the most recent beacon from the endpoint.

19 Claims, 6 Drawing Sheets

(56) References Cited

U.S. PATENT DOCUMENTS

| | | | |
|---|---|---|---|
| 2005/0044211 A1* | 2/2005 | Adhikari | H04L 69/40 |
| | | | 709/224 |
| 2010/0172258 A1 | 7/2010 | Yang et al. | |
| 2012/0192025 A1 | 7/2012 | Veillette | |
| 2013/0166641 A1 | 6/2013 | Kan et al. | |
| 2014/0085105 A1 | 3/2014 | Vaswani et al. | |
| 2014/0105037 A1* | 4/2014 | Manthiramoorthy | |
| | | | H04W 52/146 |
| | | | 370/252 |
| 2017/0070563 A1* | 3/2017 | Sundermeyer | H04L 67/125 |
| 2017/0134395 A1 | 5/2017 | Enns et al. | |
| 2018/0212568 A1* | 7/2018 | Chu | H03F 1/0277 |

OTHER PUBLICATIONS

McCarthy et al., "An Efficient Broadcast Query Forwarding Technique for Wireless Multipath Routing", Performance, Computing, and Communications Conference,IPCCC 2005. 24TH IEEE International Phoenix, Apr. 7, 2005, pp. 337-346.

International Patent Application No. PCT/US2019/064127, Partial Search Report and Invitation to Pay Additional Fees, dated Mar. 19, 2020, 13 pages.

Uchiyama et al., "Neighbor Selection Algorithm for Ad Hoc Networks with Highly Dynamic Urban Mobility", Wireless Communications and Mobile Computing,IWCMC ,International, IEEE, Aug. 6, 2008, pp. 165-170.

International Patent Application No. PCT/US2019/064127, International Search Report and Written Opinion, dated Jun. 23, 2020, 22 pages.

\* cited by examiner

SYSTEMS AND METHODS FOR NODE OUTAGE DETERMINATION AND REPORTING

TECHNICAL FIELD

This disclosure relates generally to processes for detecting and reporting node outages within a mesh network. More particularly this disclosure relates to the use of neighbor node beaconing and pinging to detect node outages within the mesh network.

BACKGROUND

Networked systems, such as networks of smart power, gas, and water meters and other smart devices (i.e., devices capable of connecting to and communicating with other devices or networks), are capable of interconnecting with each other for interdevice communication. Further, one or more of the smart devices within the networked systems may be capable of interconnecting with the internet or other networks. For example, a networked system provides the smart devices with a mechanism to communicatively couple with one another and exchange data. The networked system may include one or more nodes that connect to a network (e.g., the internet or an intranet) either directly or indirectly through additional layers of parent and root nodes or collectors. The networked system may also include nodes that link with the parent nodes or other child nodes to exchange data across the networked system.

Certain issues arise with node reliability and node outage detection and reporting for nodes within the networked system. For example, the nodes may rely on a supercapacitor to provide sufficient power for the node to transmit an outage indication after the node stops receiving power from a primary power source of the node. Over time, liquid (e.g., an electrolyte mixture) stored within the supercapacitor may leak, and the leaking liquid may short electrical components and result in a premature breakdown of the node. Additionally, outage indications transmitted by the node powered by the supercapacitor may not always be detected by other nodes in the networked system due to a lossy nature of communication across the networked system. Accordingly, the outage indication may never be received by other nodes in the networked system and reported to a head-end system. Thus, outage events of nodes in the networked system may not be adequately or consistently detected and reported to the head-end system for further remediating action.

SUMMARY

Aspects and examples are disclosed for apparatuses and process for node outage determination and reporting. For instance, an endpoint outage detection method includes receiving, at a first node, a set of beacons originating from a set of endpoints. The set of beacons are received during a time period that corresponds to at least a single beacon interval, and the set of beacons are sent using a power strength to reach a set of nodes within a physical proximity of the set of endpoints. The method also includes establishing, at the first node, a list including one or more endpoints of the set of endpoints from which the first node receives the set of beacons at more than a threshold percentage of the beacon intervals. Further, the method includes detecting, at the first node, that a threshold number of the beacon intervals have passed since receiving a first most recent beacon from a first endpoint of the list. Moreover, the method includes outputting, from the first node, a ping at full power strength to the first endpoint requesting a response to the ping. When the response to the ping is not received from the first endpoint, the method includes transmitting, by the first node, an outage alarm message to a next topologically higher layer of a mesh network. The outage alarm message includes an identification of the first endpoint and a timestamp indicating when the first node received the first most recent beacon from the first endpoint.

In another example, a node of a networked system includes a processor to execute computer-readable instructions and a memory to store the computer-readable instructions that, when executed by the processor, cause the processor to perform operations. The operations include receiving a set of limited range beacons originating from a set of endpoints. The set of limited range beacons are received during a time period that corresponds to at least a single beacon interval, and the set of limited range beacons are sent using a reduced power strength to reach a set of nodes within a physical proximity of the set of endpoints. The operations also include establishing a list including one or more endpoints of the set of endpoints from which the node receives the set of limited range beacons at more than a threshold percentage of the beacon intervals. Further, the operations include detecting that a threshold number of beacon intervals have passed since receiving a first most recent limited range beacon from a first endpoint of the list. Moreover, the operations include outputting a ping at full power strength to the first endpoint requesting a response to the ping. When the response to the ping is not received from the first endpoint, the operations include transmitting an outage alarm message to a next topologically higher layer of a mesh network. The outage alarm message includes an identification of the first endpoint and a timestamp indicating when the node received the first most recent limited range beacon from the first endpoint.

In another example, a node includes a processor that executes computer-readable instructions and a memory that stores the computer-readable instructions that, when executed by the processor, cause the processor to perform operations. The operations include receiving an alarm packet from a second node and parsing the alarm packet into endpoint identifications. The operations also include analyzing the endpoint identifications for repeat alarm indications and storing non-repeat alarm indications of the endpoint identifications. Further, the operations include generating an updated alarm packet including the non-repeat alarm indications and transmitting the updated alarm packet to a next topologically higher layer of a mesh network including the node and the second node.

These illustrative aspects and features are mentioned not to limit or define the presently described subject matter, but to provide examples to aid understanding of the concepts described in this application. Other aspects, advantages, and features of the presently described subject matter will become apparent after review of the entire application.

BRIEF DESCRIPTION OF THE FIGURES

These and other features, aspects, and advantages of the present disclosure are better understood when the following Detailed Description is read with reference to the accompanying drawings.

DETAILED DESCRIPTION

Systems and methods are provided for node outage determination and reporting in a networked system of smart devices. Within the networked system, a node may be any point in the networked system capable of transmitting data to and receiving data from other nodes or a centralized network (e.g., the internet or an intranet). To provide proper accounting of statuses of the nodes connected to the networked system, the networked system includes a process that leverages node capabilities to manage node outage detection at the nodes connected to the networked system.

In operation, the nodes in the networked system may output a beaconing signal with a limited power range. The beaconing signal may be a radio frequency (RF) signal that provides a preamble identifying the RF signal as a beacon signal and also an identification of the node originating the RF signal. The beaconing signal may be received by a limited number of other nodes within the limited power range of the beaconing signal. Upon detecting that a beaconing signal from a node has not been received at other nodes for a specified number of beacon intervals, one or more of the other nodes may ping the missed node requesting a response from the missed node indicating that the missed node is still operational. If no response is received from the missed node, the other nodes may transmit outage alarm messages through the layers of the networked system. Each layer of the network system may filter and consolidate the outage alarm messages such that a root node receives an indication of all non-functioning nodes in the networked system without repeated indications of node outages. The root node, which may connect to a head-end system using a centralized network (e.g., the internet), may provide the indication of the non-functioning nodes as an alarm packet to the head-end system. At the head-end system, measures may be taken to address the non-functioning nodes. For example, technicians may be deployed to perform physical inspections and repairs on the non-functioning nodes. In another example, where the nodes are related to endpoints associated with a power grid, a number of non-functioning nodes may indicate a power outage. The information about the non-functioning nodes may be used to provide accurate outage information to customers or to identify the scope of the problem.

Figure 1:
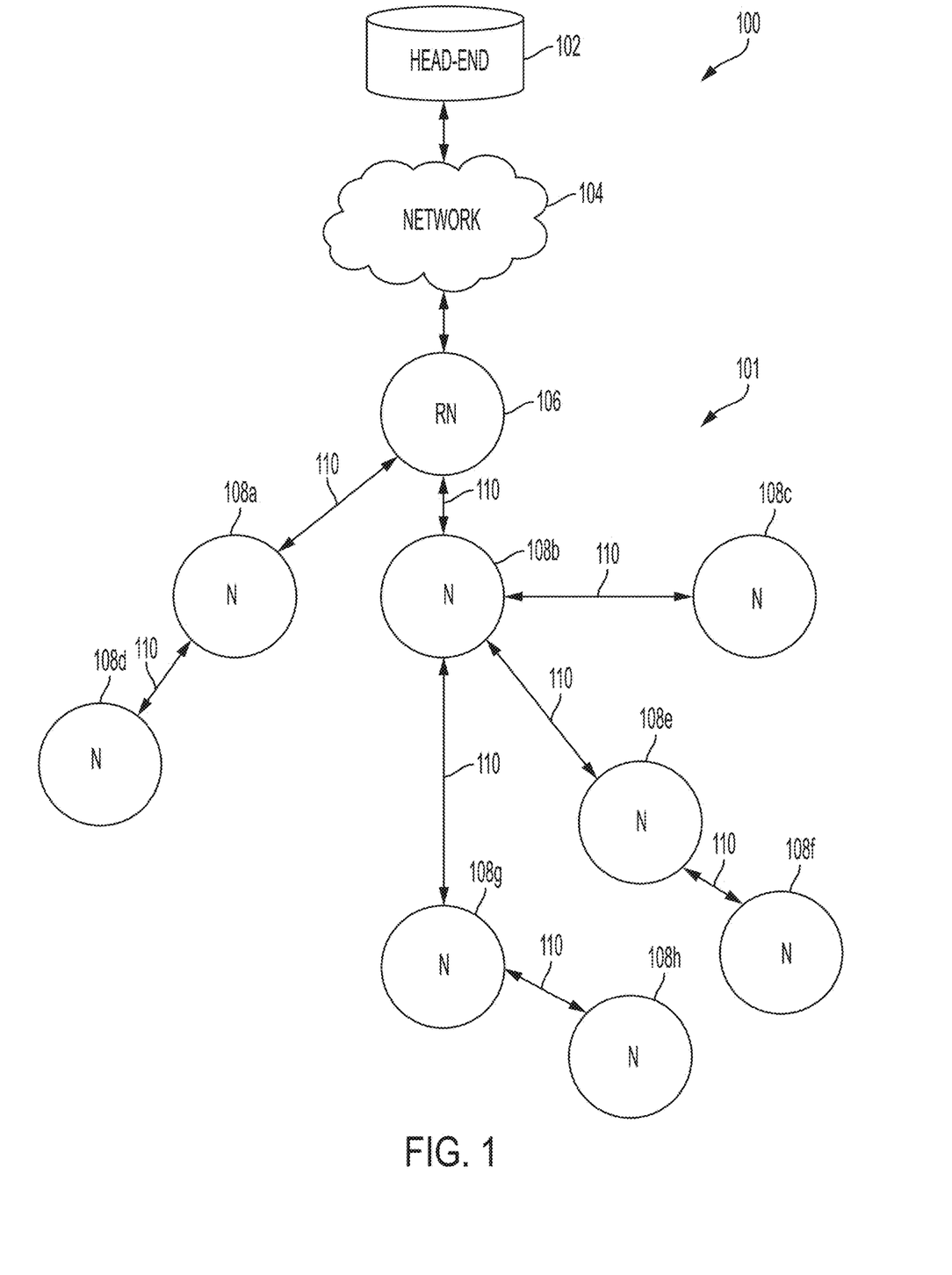
FIG. 1 is a block diagram illustrating an example of a networked system of smart devices, in accordance with one or more examples.

FIG. 1 is a block diagram illustrating an example of a networked system 100 and a mesh network 101. The networked system 100 and the mesh network 101 provides a network infrastructure for smart devices (e.g., resource consumption meters, vehicles, home appliances, etc. that include communication technology) to communicate across a network of nodes (i.e., other smart devices), the internet, and/or an intranet. The networked system 100 includes a head-end 102, which may function as a central processing system that receives a stream of data from a network 104. The network 104 may be the internet, an intranet, or any other data communication network. The mesh network 101 may include a root node 106 and other nodes 108a-108h collect data associated with the nodes 106 and 108a-108h, and the root node 106 transmits the collected data to the network 104 and ultimately to the head-end 102 of the networked system 100. The root node 106 may be a personal area network (PAN) coordinator, an internet gateway, or any other device capable of connecting to the network 104.

The root node 106 may generally be referred to as a parent node due to data links with the nodes 108a and 108b that are located at a node layer (e.g., layer one) below the root node 106. For example, the root node 106 is illustrated as communicating directly with the network 104. As illustrated, nodes 108a and 108b may also be referred to as parent nodes due to data links with nodes 108c, 108d, 108e, and 108g that are located at a node layer (e.g., layer two) below the nodes 108a and 108b. Further, nodes 108e and 108g may be referred to as parent nodes due to data links with nodes 108f and 108h that are located at a node layer (e.g., layer three) below the nodes 108e and 108g. The nodes 108a-108h may all funnel information up through the node layers to the root node 106 and ultimately to the head-end 102.

Each of the nodes 106 and 108a-108h are linked with at least one of the other nodes 106 and 108a-108h. Links 110 may be created by storing neighboring node information in neighbor caches of the nodes 106 and 108a-108h that provide indications to the nodes 106 and 108a-108h of the other nodes 106 and 108a-108h through which data may be routed. For example, the neighbor cache of the node 108h may include neighboring node information identifying that data collected at the node 108h should be transmitted to the node 108g. Likewise, the neighbor cache of the node 108g may include neighboring node information identifying that the node 108g should transmit relevant information to the node 108h (e.g., information from the head-end 102) and also identifying that the node 108g should transmit data collected by the node 108g and data received from the node 108h to the node 108b. Such a data transmission scheme may continue up through the node layers of the mesh network 101.

In operation, fewer or more nodes 108 may be included in the mesh network 101, and more root nodes 106 may also be included in the networked system 100. Additionally, while the mesh network 101 depicted in FIG. 1 includes a root node layer (i.e., the root node 106), layer one (i.e., the nodes 108a and 108b), layer two (i.e., the nodes 108c, 108d, 108e, and 108g), and layer three (i.e., the nodes 108f and 108h), fewer or more node layers are also contemplated. Moreover, while FIG. 1 depicts a specific network topology (e.g., a DODAG tree topology), other network topologies are also possible (e.g., a ring topology, a mesh topology, a star topology, etc.).

The head-end 102 may keep track of operational and non-operational nodes 106 and 108a-108h. To track the status of the nodes 106 and 108a-108h, the nodes 106 and 108a-108h transmit radio frequency (RF) beacon signals with enough strength to be received only by other nodes 106 and 108a-108h that are within close physical proximity to the transmitting nodes 106 and 108a-108h. For example, the node 108h may transmit the RF beacon signals with only enough strength for the nodes 108e, 108f, and 108g to consistently receive the RF beacon signals. In an example, the RF beacon signals may be referred to as limited range beacons since the transmission strength of the RF beacon signals may be limited. The RF beacon signals are limited to reception by other nodes 106 and 108a-108h located within a transmission strength radius of the node sending the limited range beacon. In this manner, the RF beacon provides peer-to-peer communication between a subset of the nodes 106 and 108a-108h located within the transmission strength radius of the node sending the limited range beacon.

The RF beacon signals may include an identification of the node 106 or 108a-108h transmitting the RF beacon signals. For example, the RF beacon signals may include a preamble identifying the RF beacon signals as beacon signals and also an identification of the node 106 or 108a-108h originating the RF beacon signal. A representation with only the preamble and the node identification may be only 4-8 bytes of data, but a larger or a smaller sized RF beacon signal is also contemplated. Other information associated with the transmitting node 106 or 108a-108h is also contemplated as being included as part of the RF beacon signal.

In other examples, the outage information is communicated as part of a regular beacon (e.g., a full power strength beacon used for network maintenance). If a regular beacon is used, then the regular beacon may include an information element (IE) to indicate whether outage information is included on the regular beacon. For example, the IE of the regular beacon may distinguish the regular beacon with outage information from a network maintenance beacon also transmitted at full power strength.

Including additional information in the RF beacon signal about the status of the other nodes 106 and 108a-108h received by the transmitting node 106 or 108a-108h may result in fewer false-positive outage alarms for the nodes 106 and 108a-108h. For example, a receiving node 106 or 108a-108h that receives the RF beacon signal from the transmitting node 106 or 108a-108h may compare the information received from the RF beacon signal to information that the receiving node 106 or 108a-108h received from other low-powered RF beacon signals from other nodes or from alarm packets including outage information associated with multiple nodes received from other nodes 106 and 108a-108h. Based on this comparison, the receiving node 106 or 108a-108h may remove false-positive outage indications from an alarm packet transmitted by the receiving node 106 or 108a-108h to a node layer above a node layer of the receiving node 106 or 108a-108h.

In an example, the strength of the RF beacon signals output by each of the nodes 106 and 108a-108h may be adjusted such that between 5 and 10 other nodes 106 and 108a-108h receive the RF beacon signals from that individual node. In such an example, the strength of the RF beacon signal may be 0 dBm or a range from −3 dBm to 10 dBm, and the strength may be adjusted based on how many of the nodes 106 and 108a-108h are located within close proximity to the node 106 or 108a-108h transmitting the RF beacon signals. That is, the strength of the RF beacon signals may increase to reach additional nodes 106 and 108a-108h or decrease to reach fewer additional nodes 106 and 108a-108h depending on a specific arrangement of the additional nodes 106 and 108a-108h in the mesh network 101. In an example, when the strength of the RF beacon signal is such that 6 nodes receive the RF beacon signal with a success rate greater that 50%, a subsequent success rate that each RF beacon signal will reach at least one of the 6 nodes will be at least 98.4% (i.e., $1-0.5^6$). This success rate may increase based on an increase in the number of nodes 106 and 108a-108h within range of the transmitting node 106 or 108a-108h, based on an increase in the success rate of the individual receiving nodes 106 and 108a-108h, or both.

The RF beacon signals may be transmitted by each of the nodes 108a-108h at defined beacon intervals. For example, the nodes 108a-108h may transmit the RF beacon signals every 5 seconds. Longer or shorter beacon intervals are also contemplated. Additionally, each of the nodes 108a-108h may control their own beacon intervals, and synchronization of the beacon intervals may not be performed across the nodes 108a-108h. In an example, the period between RF beacon signals may be selected to optimize among increasing uniform distribution of the RF beacon signals from transmitting nodes 108a-108h, minimizing interference from other RF beacon signals or other RF transmissions of the mesh network 101, and maximizing a resolution of outage event timestamps. For example, maximizing the resolution of the outage event timestamps may call for reducing the beacon intervals to a small time period, while minimizing interference from other RF sources may call for increasing the beacon intervals to a larger time period.

Over time, each of the nodes 106 and 108a-108h receive RF beacon signals from one or more other nodes 106 and 108a-108h. When the receiving nodes 106 and 108a-108h receive the RF beacon signals from one or more of the other nodes 106 and 108a-108h at a percentage of beacon intervals that is greater than a threshold percentage, the receiving nodes 106 and 108a-108h may track when the RF beacon signals from the one or more of the other nodes 106 and 108a-108h are missed. After missing the RF beacon signal for a predetermined number of beacon intervals from a tracked node 106 or 108a-108h, the receiving node 106 or 108a-108h may initiate an endpoint ping process.

In an example, the endpoint ping process may involve the node 106 or 108a-108h transmitting a ping (e.g., a request for a response) to the tracked node 106 or 108a-108h from which the RF beacon signal has not been received at the node 106 or 108a-108h for the predetermined number of beacon intervals (e.g., three beacon intervals). The endpoint ping process provides an additional detection layer to make sure that the tracked node 106 or 108a-108h is not functioning properly before transmitting an outage alarm message. The ping may be transmitted at full power strength of the node 106 or 108a-108h (e.g., 20 dBm-30 dBm). If the tracked node 106 or 108a-108h is still operational, the tracked node 106 or 108a-108h may transmit a message at full power strength back to the node 106 or 108a-108h indicating an operational status of the tracked node 106 or 108a-108h. In such an example, the beaconing process may resume without escalating the outage alarm message to other node layers of the mesh network 101.

If the tracked node 106 or 108a-108h is no longer operational due to a sustained loss of power without an alternative power source, then no response to the ping is received at the node 106 or 108a-108h. To reduce the likelihood that the node 106 or 108a-108h failed to detect the response, the endpoint ping process may be repeated two or more times. By repeating the endpoint ping process, a likelihood of a false-positive outage detection of the tracked node 106 or 108a-108h may decrease significantly.

When the node 106 or 108a-108h does not receive a response from the tracked node 106 or 108a-108h during the endpoint ping process, the node 106 or 108a-108h may build an outage alarm message to be directed up the node layers of the mesh network 101. The outage alarm message may include an indication of the tracked node 106 or 108a-108h that is not functioning and also an indication of a time stamp of a most recent RF beacon signal received by the node 106 or 108a-108h from the tracked node 106. In an example, the node 106 or 108a-108h may package the outage alarm message from the tracked node 106 or 108a-108h with other outage alarm messages from other nodes 106 or 108a-108h that are also in outage. Such a package may be referred to as an alarm packet.

When an alarm packet (e.g., a data packet including an indication of multiple nodes 106 and 108a-108h that are in outage) is received at a node 106 or 108a-108h in a next higher node level, a filtering and consolidation process may occur to prevent transmission of unnecessary or repeat outage indications. For example, the node 106 or 108a-108h that receives the alarm packet may parse the alarm packet into multiple endpoint identifications that indicate which of the nodes 106 and 108a-108h are indicated in the alarm packet as being in outage. The endpoint identifications are analyzed by the node 106 or 108a-108h for repeat alarm indications (e.g., if the node 106 or 108a-108h already knows of one or more of the nodes 106 and 108a-108h that are in outage). The non-repeat alarm indications are stored for further analysis.

The stored alarm indications are then cross-referenced to see if any of the stored alarm indications come from one of the nodes 106 or 108a-108h that the analyzing node 106 or 108a-108h monitors for RF beacon signals. If not, the analyzing node 106 or 108a-108h forwards the alarm packet to a next higher node layer of the mesh network 101. If one or more of the stored alarm indications correspond to nodes monitored by the analyzing node 106 or 108a-108h, the analyzing node 106 or 108a-108h determines if an RF beacon signal was received for the one or more stored alarm indications to ensure that the RF beacon signal was not missed by the node 106 or 108a-108h in the topologically lower node layer of the mesh network 101. If the RF beacon signal was not received by the analyzing node 106 or 108a-108h, the analyzing node 106 or 108a-108h may forward the alarm packet to the next topologically higher node layer of the mesh network 101. If the RF beacon signal was received by the analyzing node 106 or 108a-108h, the analyzing node 106 or 108a-108h may remove the node 106 or 108a-108h providing the RF beacon signal from the alarm packet before transmitting an updated alarm packet to the next topologically higher node layer of the mesh network 101. This process involves filtering out repeat alarm indications from alarm packets and also removing false-positive outage indications from the alarm packets prior to transmitting the alarm packet to the next topologically higher node layer of the mesh network 101.

Figure 5:
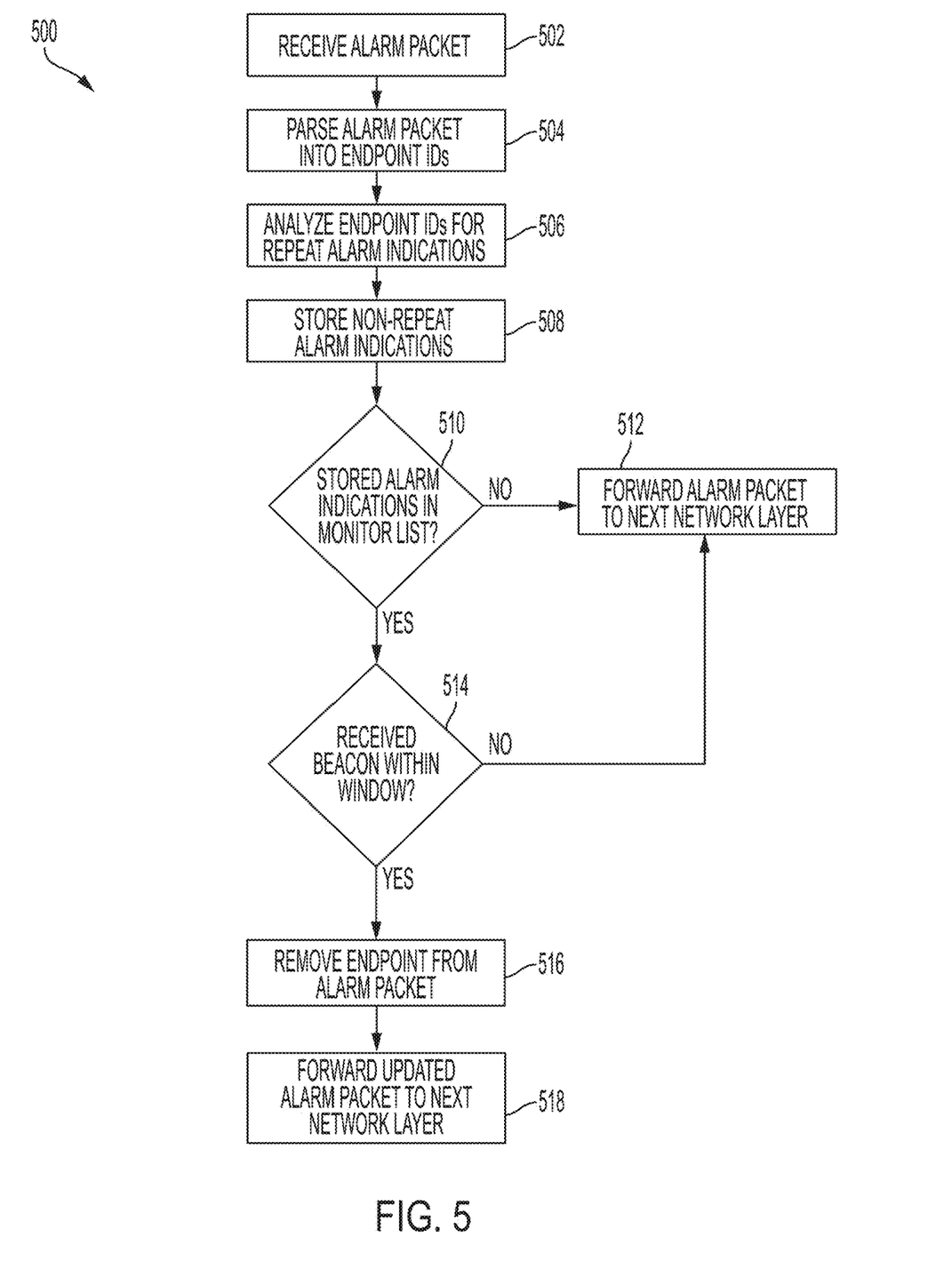
FIG. 5 is an example of a process for a node of the networked system of FIG. 1 to perform in response to receiving an alarm packet from an additional node, in accordance with one or more examples.

To help illustrate, in an example, the node 108h may transmit RF beacon signals at beacon intervals that are strong enough to reach nodes within a communication range. In the example, each of the nodes 108e, 108f, and 108g may be within a communication range of the RF beacon signals such that the nodes 108e, 108f, and 108g receive the RF beacon signals with enough consistency to track the RF beacon signals from the node 108h. When the node 108f fails to receive the RF beacon signal from the node 108h over multiple consecutive beacon intervals, the node 108f may ping the node 108h. If the node 108f does not receive a response to the ping from the node 108h, the node 108f may generate an outage alarm message and transmit the outage alarm message to the node 108e (e.g., to a node layer above the node 108f). Because the node 108e also tracks the node 108h, the node 108e may make a determination as to whether the node 108e has received an RF beacon signal from the node 108h. If not, the node 108e transmits the outage alarm message, or an alarm packet if transmitting multiple outage alarm messages, to the node 108b (e.g., to a node layer above the node 108e). The filtering and consolidation process, as described in detail below with respect to FIG. 5, is repeated, and the resulting alarm packet is provided to the root node 106 (e.g., to a node layer above the node 108b). The root node 106 may perform the filtering and consolidation process and transmit the resulting alarm packet to the head-end 102 by way of the network 104. In addition to an alarm packet transmission path described above, the alarm packet may also be transmitted through the node 108g, to node 108b, to the root node 106, and ultimately to the head-end 102. Other node arrangements and alarm packet paths are also contemplated within the mesh network 101.

When the head-end 102 receives the alarm packet from the root node 106, the head-end 102 may deploy technicians to address the one or more nodes 106 and 108a-108h indicated by the alarm packet as being in outage. For example, the technician may be deployed to repair or replace the nodes 106 and 108a-108h identified by the alarm packet. Further, the head-end 102 may maintain a record of the nodes 106 and 108a-108h that are in outage.

In one or more additional examples, the RF beacon signal may be a beacon that is generally used for network maintenance of the mesh network 101. In such an example, the RF beacon signal may be transmitted at a full power strength of the node 106 or 108a-108h transmitting the RF beacon signal. Accordingly, the RF beacon signal may be received by a much larger number of additional nodes 106 or 108a-108h than when the transmission strength of the RF beacon signal is limited.

Figure 2:
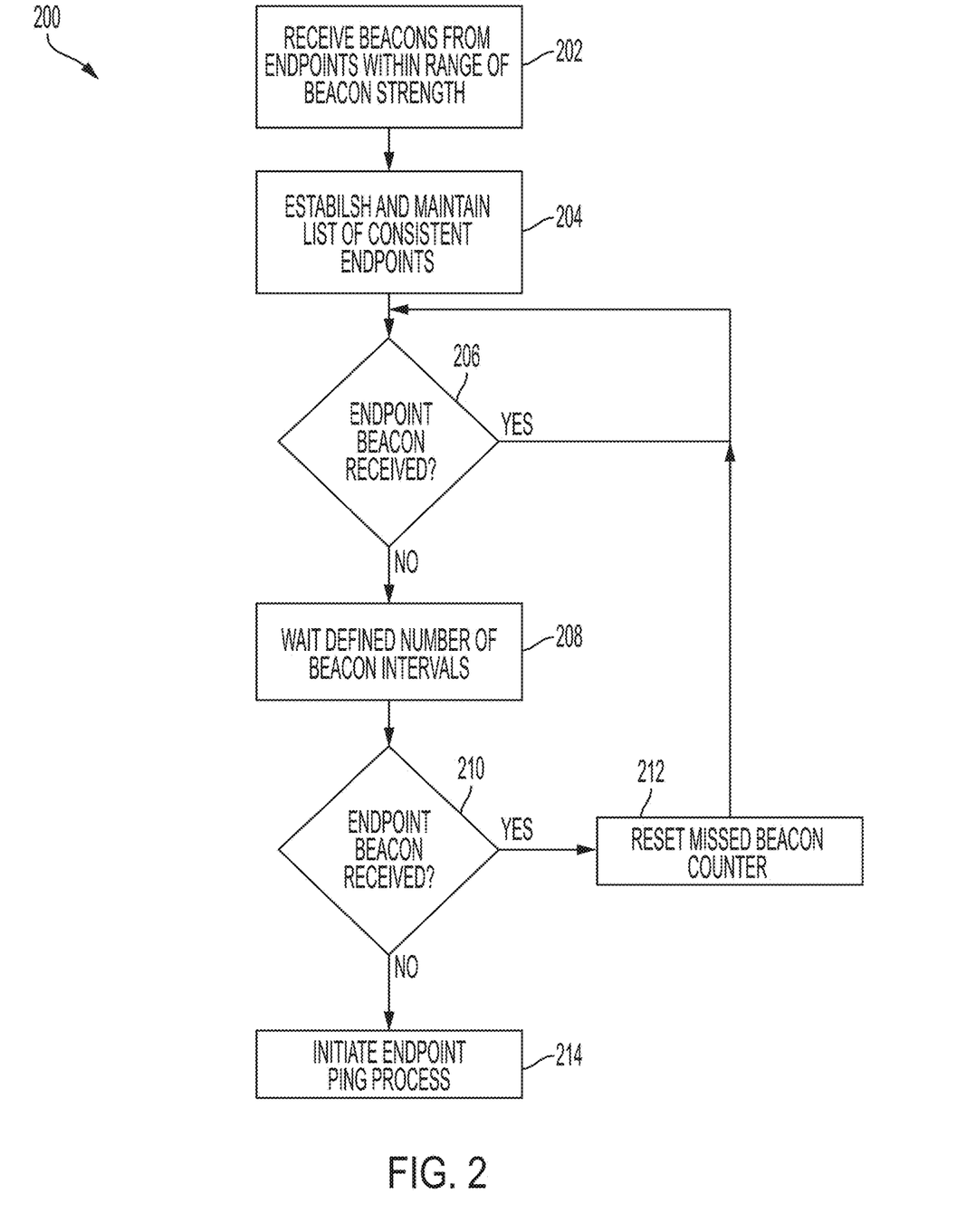
FIG. 2 is an example of a process for detecting endpoint outages in the networked system of FIG. 1, in accordance with one or more examples.

FIG. 2 is an example of a process 200 for detecting endpoint outages in the mesh network 101. At block 202, the process 200 involves a receiving node (e.g., one of the nodes 106 or 108a-108h) receiving RF beacon signals from endpoints (e.g., other nodes 106 and 108a-108h) that are close enough to the receiving node to consistently provide the RF beacon signals to the receiving node. As discussed above with respect to FIG. 1, the signal strength of the RF beacon transmitted by the endpoints to the receiving node may be adjusted such that the RF beacon signal from each endpoint is receivable by a limited number of neighboring nodes. For example, the strength of the RF beacon signal may be set to 0 dBm to reach between 5 and 10 neighboring nodes. The RF beacon signals transmitted by the endpoints may be transmitted at regular beacon intervals. In an example, the beacon intervals may be set to 5 or 10 seconds, but other beacon intervals may also be selected. Further, each of the RF beacon signals includes an identification of the endpoint associated with the RF beacon signal.

At block 204, the process 200 involves establishing and maintaining a list of endpoints from which the receiving node consistently receives the RF beacon signals. By way of example, an endpoint may be added to the list when the receiving node receives RF beacon signals from the endpoint during at least 50% of the beacon intervals. The list of endpoints may include a missed beacon counter that keeps count of consecutively missed RF beacon signals for each endpoint, and the missed beacon counter is reset each time a new RF beacon signal is received from the assigned endpoint. Additionally, the list of endpoints maintained by the receiving node may include a most recent RF beacon signal and a timestamp for the most recent RF beacon signal for every endpoint on the list of endpoints.

Further, the list of endpoints may be adjusted by adjusting a percentage threshold value of successfully receiving the RF beacon signal from the endpoints. For example, to maintain a reasonable number of tracked endpoints for the individual receiving node, the list of endpoints may only include endpoints from which the RF beacon signal is successfully received at the receiving node at more than a specified percentage of the beacon intervals. To increase the number of endpoints on the list of endpoints, the specified percentage may decrease (e.g., from 50% to 40%). To decrease the number of endpoints on the list of endpoints, the specified percentage may increase (e.g., from 50% to 60%).

At block 206, the process 200 involves determining if the receiving node has received an RF beacon signal from one of the endpoints of the list of endpoints during a beacon interval. If the receiving node received the RF beacon signal during the beacon interval, no change to the counter of consecutively missed RF beacon signals is made and the process 200 returns to block 206. If the receiving node did not receive the RF beacon signal during the beacon interval, the missed beacon counter may increase by 1.

At block 208, the process 200 involves waiting a defined number of beacon intervals. Due to the lossy nature of the mesh network 101, the RF beacon signal may occasionally be missed by the receiving node even though the RF beacon signal was transmitted by the endpoint. Accordingly, the receiving node may wait for a specified number of beacon intervals before making a determination that the endpoint may be in outage. In an example with a 10 second beacon interval, the receiving node may wait for three beacon intervals (i.e., 30 seconds) without moving forward with the process 300. Other beacon interval lengths and defined numbers of beacon intervals may also be used at block 208.

At block 210, the process 200 involves determining if the RF beacon signal was received by the receiving node while waiting the defined number of beacon intervals. If an RF beacon signal for the endpoint was received while waiting the defined number of beacon intervals, the missed beacon counter for the endpoint is reset at block 212, and the process 200 returns to block 206. Further, if a regular communication is received from the endpoint (e.g., a transmission of metering data from the endpoint to the receiving node or to any other node in the network but heard by the receiving node), such a communication has the same effect as receiving the RF beacon signal at the receiving node. Accordingly, the missed beacon counter is reset at block 212, and the process 200 returns to block 206. If the RF beacon signal for the endpoint was not received while waiting the defined number of beacon intervals, an endpoint ping process is initiated at block 214, as discussed below with respect to FIG. 3.

Figure 3:
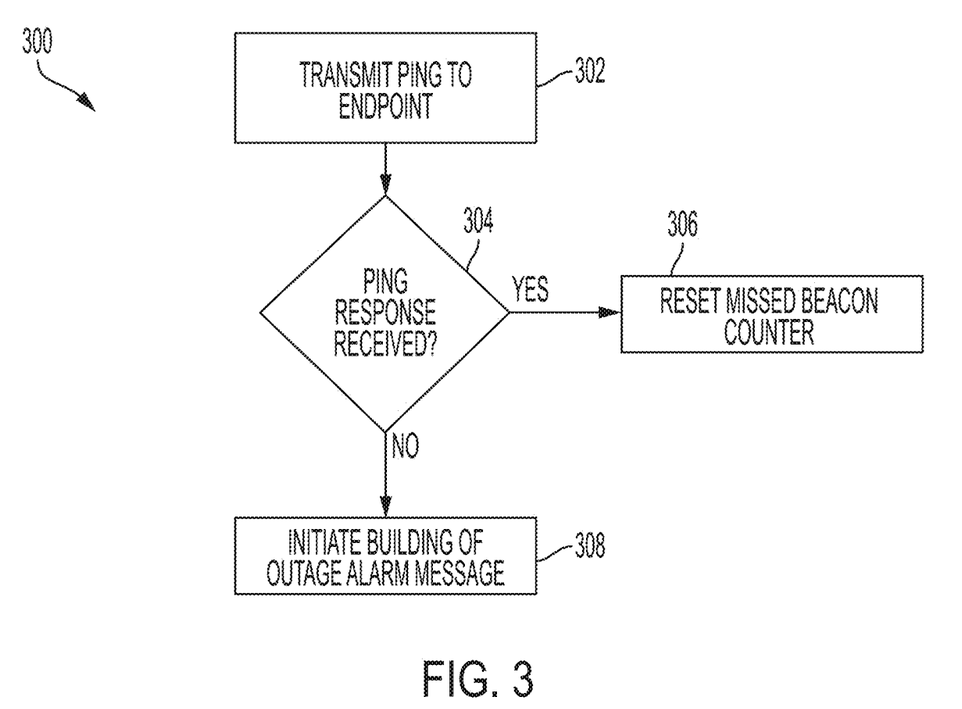
FIG. 3 is an example of a process for pinging endpoints in the networked system of FIG. 1, in accordance with one or more examples.

FIG. 3 is an example of a process 300 for pinging endpoints in the mesh network 101. As discussed above, the process 300 (i.e., the endpoint ping process) is initiated when the receiving node has not received an RF beacon signal from the endpoint over a predetermined number of consecutive beacon intervals. At block 302, the process 300 involves transmitting a ping from the receiving node to the endpoint. The ping may be a signal requesting a response from the specific endpoint, and the ping may be transmitted using a full power strength of the receiving node. In an example, the full power strength may be between 20 dBm and 30 dBm, but other signal strengths are also contemplated. The full power strength of the ping may be significantly larger than the strength of an RF beacon signal to ensure that the endpoint has a much better opportunity to receive the ping.

At block 304, the process 300 involves determining if a ping response is received by the receiving node from the endpoint. If the ping response is received by the receiving node, the missed beacon counter is reset at block 306. In resetting the missed beacon counter, the endpoint is identified as operational and the process 200, as discussed above, may be used to identify outages of the endpoint during future time periods.

If the ping response is not received by the receiving node from the endpoint, the process 300 may involve initiating building of an outage alarm message at block 308. The outage alarm message may be a message transmitted through the node layers of the mesh network 101 identifying the endpoint and indicating that the endpoint is in outage. The outage alarm message may be transmitted through the node layers where it may be cross-checked for a false-positive outage indication, as discussed below with respect to FIG. 5. If no determination is made in the node layers that the outage alarm message is a false-positive outage indication, then the head-end 102 may ultimately receive and act on the outage alarm message. For example, the head-end 102 may deploy a technician to repair or replace the endpoint in outage or the cause of the outage when the cause is not at the endpoint in outage.

In an example, the process 300 may be repeated multiple times prior to initiating the building of the outage alarm message at block 308. For example, the receiving node may transmit multiple pings to the endpoint over a period of time. If the receiving node does not receive a response to any of the multiple pings, the process 300 may then proceed to initiating the building of the outage alarm message at block 308.

Figure 4:
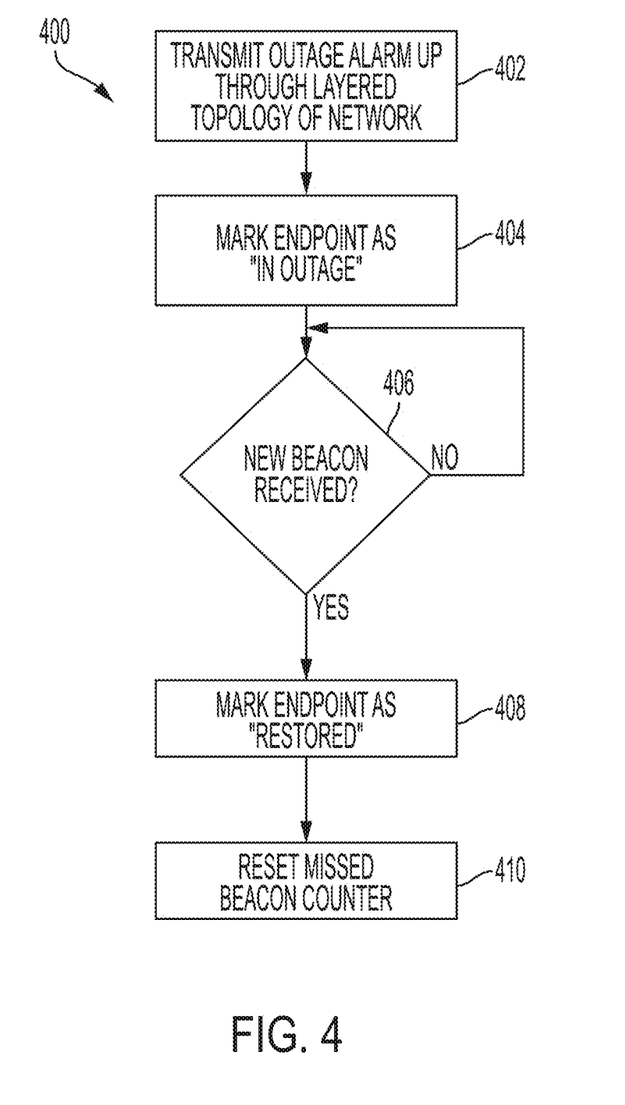
FIG. 4 is an example of a process for a node of the networked system of FIG. 1 to perform in response to detecting an endpoint outage, in accordance with one or more examples.

FIG. 4 is an example of a process 400 for the receiving node of the mesh network 101 to perform in response to detecting an endpoint outage of the endpoint by the process 300. At block 402, the process 400 involves transmitting the outage alarm message up through a layered topology of the mesh network 101. As discussed above with respect to FIG. 1, the outage alarm message may be transmitted from the receiving node to a node 106 or 108*a*-108*h* in a node layer above the receiving node. In an example, when the node 108*e* is the receiving node at layer two of the mesh network 101, the node 108*e* transmits the outage alarm message, or an outage alarm packet if the node 108*e* has multiple outage alarm messages, to the node 108*b*, which is located at layer one of the mesh network 101.

At block 404, the process 400 involves marking the endpoint as "in outage" in the list of endpoints maintained by the receiving node. Marking the endpoint as "in outage" may prevent the receiving node from transmitting multiple outage alert messages for the same endpoint after the in outage determination is made. After marking the endpoint as "in outage," at block 406, the process 400 involves determining if a new RF beacon signal from the endpoint has been received by the receiving node. If a new RF beacon signal from the endpoint has not been received, block 406 is repeated.

At block 408, if the receiving node receives a new RF beacon signal from the endpoint, the process 400 involves marking the endpoint as "restored" in the list of endpoints maintained by the receiving node. In an example, upon marking the endpoint as "restored," the receiving node may transmit an endpoint restored message up through the layered topology of the mesh network 101. The endpoint restored message may include an identification of the restored endpoint.

At block 410, the process 400 involves resetting the missed beacon counter of the endpoint at block 410. By resetting the missed beacon counter, the receiving node is again able to monitor the endpoint for an outage using the process 200 described above with respect to FIG. 2. Accordingly, any subsequent outages of the endpoint detected by the receiving node may be transmitted as outage alarm messages through the layered topology of the mesh network 101.

FIG. 5 is an example of a process 500 for a node 106 or 108a-108h of the mesh network 101 to perform in response to receiving an alarm packet from another node 106 or 108a-108h (e.g., the receiving node discussed above with respect to FIGS. 2-4). At block 502, the process 500 involves receiving the alarm packet at one of the nodes 106 or 108a-108h (i.e., a higher level node) from the receiving node. The higher level node may be a node 106 or 108a-108h that is located topologically closer to the root node 106 than the receiving node.

At block 504, the process 500 involves parsing the alarm packet into individual endpoint identifications. For example, the higher level node parses the alarm packet to identify individual endpoints identified in the alarm packet and any additional information included in the alarm packet associated with the individual endpoints (e.g., a most recent timestamp of a received RF beacon signal). Other information may also be included in the alarm packet and parsed for association with the individual endpoints.

At block 506, the process 500 involves analyzing the endpoint identifications for repeat alarm indications. For example, the higher level node may receive multiple different alarm packets from different receiving nodes. The alarm packets from the different receiving nodes may identify one or more outage alarm messages that are also included in the alarm packet received by the receiving node.

When multiple outage alarm messages are received for the same endpoint, the higher level node may discard the repeat outage alarm messages. For example, at block 508, the process 500 involves storing non-repeat outage alarm messages (i.e., non-repeat alarm indications parsed from the alarm packets). At block 510, the process 500 involves determining if the stored non-repeat alarm indications are associated with endpoints that are included in a list of endpoints monitored by the higher level node for RF beacon signals. If the endpoints are not included in the list of endpoints monitored by the higher level node, at block 512, the higher level node forwards an alarm packet including the stored non-repeat alarm indications to the next higher node layer topologically of the mesh network 101.

If the endpoints are included in the list of endpoints monitored by the higher level node, at block 514, the process 500 involves the higher level node making a determination as to whether an RF beacon signal was received from any of the endpoints included in the list of endpoints monitored by the high level node. If an RF beacon signal was not received, at block 512, the higher level node forwards the alarm packet including the stored non-repeat alarm indications to the next topologically higher node layer of the mesh network 101.

At block 516, the process 500 involves removing one or more endpoints from the alarm packet if RF beacon signals were received from the one or more endpoints at the higher level node. Because the RF beacon signals were received by the higher level node from one or more of the endpoints included in the alarm packet, the higher level node is able to remove the endpoints from the alarm packet as false-positive indications of endpoint outages. The remaining endpoints from the alarm packet may be repackaged as an updated alarm packet.

At block 518, the process 500 involves forwarding the updated alarm packet to the next node layer topologically of the mesh network 101. For example, if the higher level node is in layer one of the mesh network 101, the updated alarm packet may be forwarded to the root layer of the mesh network 101 (e.g., to the root node 106) in preparation for transmission of the alarm packet to the head-end 102. When the alarm packet reaches the next network layer of the mesh network 101, the process 500 may be repeated on the alarm packet by any other node on the path of the alarm packet before forwarding the alarm packet to the next network layer or to the head-end 102 of the networked system 100.

Figure 6:
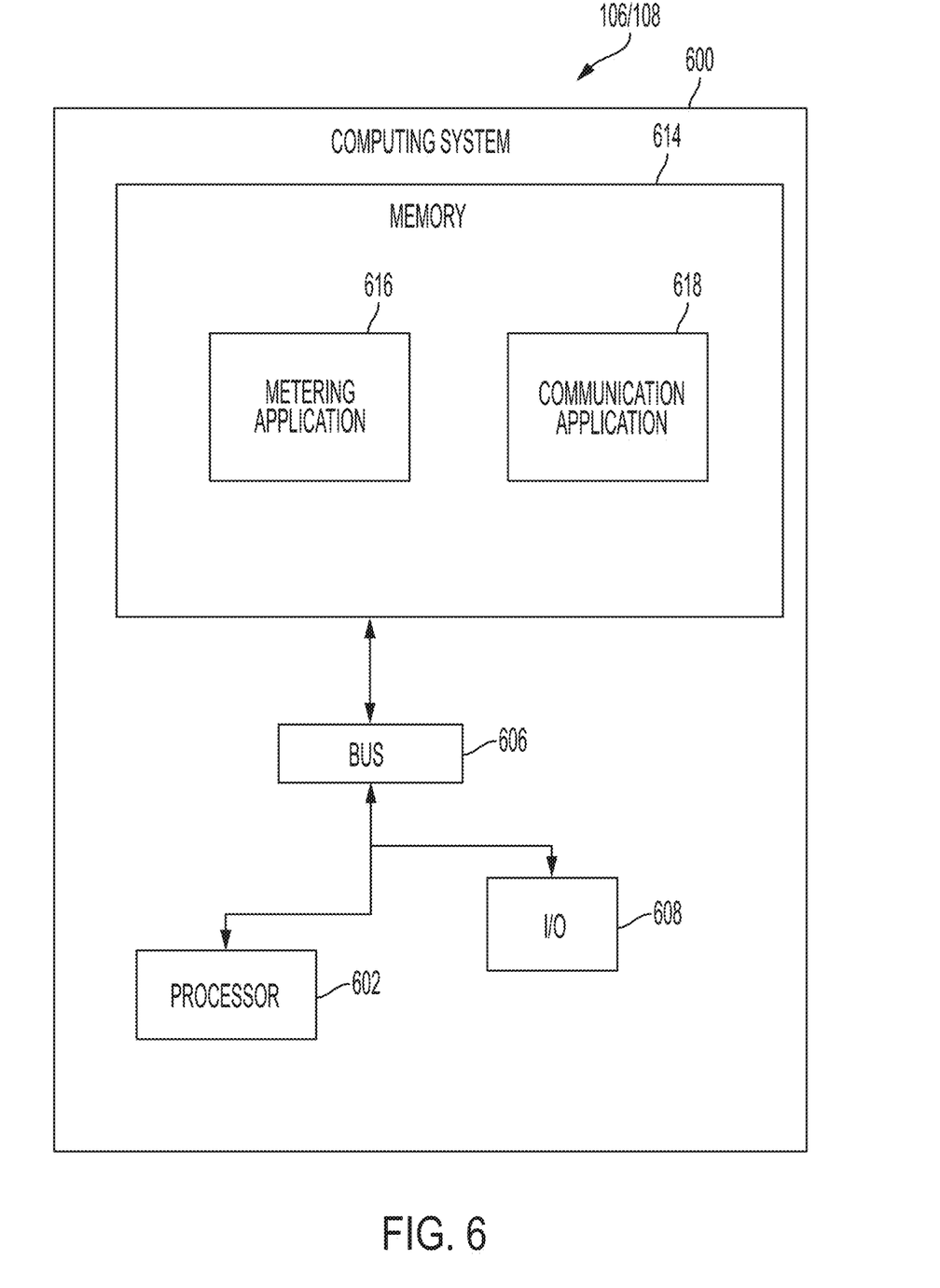
FIG. 6 is an example of a block diagram of a node of the networked system of FIG. 1, in accordance with one or more examples.

FIG. 6 is an example of a block diagram of components of a node 106 or 108 of the mesh network 101. Some or all of the components of a computing system 600 can belong to one or more of the nodes 106 or 108a-108h of FIG. 1. The computing system 600 includes one or more processors 602 communicatively coupled to one or more memory devices 614. The computing system 600 executes program code that configures the processor 602 to perform one or more of the operations described above with respect to FIGS. 1-5. For example, the memory devices 614 may include a metering application 616 (e.g., when the node 106 or 108 is a metering device) and a communication application 618. The program code of the metering application 616 and the communication application 618, which can be in the form of non-transitory computer-executable instructions, can be resident in the memory device 614 or any suitable computer-readable medium and can be executed by the processor 602. Execution of such program code configures or causes the processor(s) to perform the operations described herein with respect to the nodes 106 and 108a-108h. While FIG. 6 depicts the metering application 616 stored within the memory devices 614, other applications associated with other actions of the nodes 106 and 108a-108h may replace the metering application 616 or be added to the metering application 616 depending on the functionality of the nodes 106 and 108a-108h. Further, the communication application 618 may provide instructions for the nodes 106 and 108a-108h to implement multiple communication standards including an RF mesh or any other wired or wireless communication standards.

The computing system 600 may also include an input/output ("I/O") interface 608 that can receive input from input devices or provide output to output devices. The interface 608 may include RF antennas capable of transmitting and receiving RF communication from other nodes in the mesh network 101. The computing system 600 may also be able to communicate with one or more other computing devices or computer-readable data sources using the interface 608. Additionally, a bus 606 can also be included in the computing system 600. The bus 606 can communicatively couple one or more components of the computing system 600 and allow for communication between such components.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software (i.e., computer-readable instructions stored on a memory of the computer system) that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied; for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. An endpoint outage detection method, comprising:
   receiving, at a first node in a first layer of a mesh network, a set of beacons originating from a set of endpoints in a second layer of the mesh network, wherein the set of beacons are received during a time period that corresponds to at least a single beacon interval and the set of beacons are sent using a power strength to reach a set of nodes within a physical proximity of the set of endpoints, and wherein the first layer of the mesh network is a topologically higher layer of the mesh network than the second layer of the mesh network;
   establishing, at the first node, a list comprising one or more endpoints of the set of endpoints from which the first node receives the set of beacons at more than a threshold percentage of the beacon intervals;
   detecting, at the first node, that a threshold number of the beacon intervals have passed since receiving a first most recent beacon from a first endpoint of the list;
   outputting, from the first node, a ping at full power strength to the first endpoint requesting a response to the ping; and
   when the response to the ping is not received from the first endpoint, transmitting, by the first node, an outage alarm message to a next topologically higher layer of the mesh network, the outage alarm message comprising an identification of the first endpoint and a timestamp indicating when the first node received the first most recent beacon from the first endpoint.

2. The method of claim 1, wherein the threshold percentage of the beacon intervals is 50%.

3. The method of claim 1, further comprising:
   adjusting the threshold percentage of the beacon intervals to increase or decrease a number of the one or more endpoints of the set of endpoints included in the list.

4. The method of claim 1, further comprising:
   detecting, at the first node, that the threshold number of the beacon intervals have passed since receiving a second most recent beacon from a second endpoint of the list;
   outputting, from the first node, a second ping at full power strength to the second endpoint requesting a response to the second ping; and
   when the response to the second ping is not received from the second endpoint, transmitting, by the first node, the outage alarm message to the next topologically higher layer of the mesh network, the outage alarm message comprising an identification of the second endpoint and a second timestamp indicating when the first node received the second most recent beacon from the second endpoint.

5. The method of claim 1, wherein the full power strength of the ping comprises a ping signal between 20 dBm and 30 dBm and the power strength of the set of beacons comprises a beacon signal between −3 dBm and 10 dBm.

6. The method of claim 1, further comprising:
   marking the first endpoint in the list as in outage.

7. The method of claim 6, further comprising:
   receiving, at the first node, a second beacon from the first endpoint after marking the first endpoint in the list as in outage;
   marking the first endpoint in the list as restored; and
   transmitting, by the first node, an endpoint restored message to the next topologically higher layer of the mesh network.

8. The method of claim 1, further comprising:
   outputting, from the first node, an additional ping at the full power strength to the first endpoint requesting an additional response to the additional ping, wherein transmitting the outage alarm message occurs when the response to the ping and the additional response to the additional ping are not received at the first node.

9. A node of a networked system, comprising:
   a processor configured to execute computer-readable instructions;
   a memory configured to store the computer-readable instructions that, when executed by the processor, cause the processor to perform operations comprising:
      receiving a set of limited range beacons originating from a set of endpoints, wherein the set of limited range beacons are received during a time period that corresponds to at least a single beacon interval and the set of limited range beacons are sent using a reduced power strength to reach a set of nodes within a physical proximity of the set of endpoints, wherein a first layer of a mesh network comprising the node is a topologically higher layer of the mesh network than a second layer of the mesh network comprising the set of endpoints;
      establishing a list comprising one or more endpoints of the set of endpoints from which the node receives the set of limited range beacons at more than a threshold percentage of the beacon intervals;
detecting that a threshold number of beacon intervals have passed since receiving a first most recent limited range beacon from a first endpoint of the list;
outputting a ping at full power strength to the first endpoint requesting a response to the ping; and
when the response to the ping is not received from the first endpoint, transmitting an outage alarm message to a next topologically higher layer of the mesh network, the outage alarm message comprising an identification of the first endpoint and a timestamp indicating when the node received the first most recent limited range beacon from the first endpoint.

10. The node of claim 9, wherein the set of limited range beacons from the set of endpoints each comprise a preamble indicating that a beacon of the set of limited range beacons is a beacon signal and an identifier identifying an endpoint originating the beacon, wherein the endpoint is from the set of endpoints.

11. The node of claim 9, wherein the computer-readable instructions, when executed by the processor, cause the processor to perform operations further comprising:
adjusting the threshold percentage of the beacon intervals to increase or decrease a number of the one or more endpoints of the set of endpoints included in the list.

12. The node of claim 9, wherein the computer-readable instructions, when executed by the processor, cause the processor to perform operations further comprising:
transmitting an additional limited range beacon at a reduced power strength to reach an additional set of nodes within a physical proximity of the node.

13. The node of claim 9, wherein the full power strength of the ping comprises a signal between 20 dBm and 30 dBm.

14. The node of claim 9, wherein the full power strength of the ping comprises a signal that is at least 20 dB greater than a transmission strength of the set of limited range beacons.

15. The node of claim 9, wherein the computer-readable instructions, when executed by the processor, cause the processor to perform operations further comprising:
outputting an additional ping at the full power strength to the first endpoint requesting an additional response to the additional ping, wherein transmitting the outage alarm message occurs when the response to the ping and the additional response to the additional ping are not received at the node.

16. A node, comprising:
a processor configured to execute computer-readable instructions;
a memory configured to store the computer-readable instructions that, when executed by the processor, cause the processor to perform operations comprising:
receiving an alarm packet from a second node, wherein the node is in a first layer of a mesh network that is a topologically higher layer of the mesh network than a second layer of the mesh network of the second node;
parsing the alarm packet into endpoint identifications;
analyzing the endpoint identifications for repeat alarm indications;
storing non-repeat alarm indications of the endpoint identifications;
generating an updated alarm packet comprising the non-repeat alarm indications;
receiving a set of limited range beacons originating from a set of endpoints, wherein the set of limited range beacons are received during a time period that corresponds to at least a single beacon interval and the set of limited range beacons are sent using a reduced power strength to reach a set of nodes within a physical proximity of the set of endpoints, wherein the first layer of the mesh network is a topologically higher layer of the mesh network than an additional layer of the mesh network associated with the set of endpoints;
establishing a list comprising one or more endpoints of the set of endpoints from which the node receives the set of limited range beacons at more than a threshold percentage of the beacon intervals;
recording a set of timestamps associated with a most recent limited range beacon received from each of the one or more endpoints of the set of endpoints;
detecting that a threshold number of beacon intervals have passed since receiving a first most recent limited range beacon from a first endpoint of the list;
outputting a ping at full power strength to the first endpoint requesting a response to the ping;
when the response to the ping is not received from the first endpoint, adding an outage alarm message associated with the first endpoint to the updated alarm packet; and
transmitting the updated alarm packet to a next topologically higher layer of the mesh network comprising the node and the second node.

17. The node of claim 16, wherein the computer-readable instructions, when executed by the processor, cause the processor to perform operations further comprising:
determining that a first beacon from a first endpoint associated with one of the endpoint identifications was received at the node within a beacon window; and
adjusting the updated alarm packet by removing a first endpoint identification associated with the first endpoint from the updated alarm packet.

18. The node of claim 16, wherein the full power strength of the ping comprises a signal that is at least 20 dB greater than a transmission strength of the set of limited range beacons.

19. The node of claim 16, wherein the computer-readable instructions, when executed by the processor, cause the processor to perform operations further comprising:
determining that a regular node message from a first endpoint associated with one of the endpoint identifications was received at the node within a beacon window; and
updating the updated alarm packet by removing a first endpoint identification associated with the first endpoint from the updated alarm packet.

* * * * *